April 4, 1967 R. WATKINS 3,312,820
RAILROAD SWITCH TURNOUT HEATING APPARATUS
AND PROCESS OF OPERATION THEREOF
Filed Feb. 2, 1966 6 Sheets-Sheet 5

INVENTOR.
RAY WATKINS
BY *Ely Silver*
ATTORNEY

United States Patent Office 3,312,820
Patented Apr. 4, 1967

3,312,820
RAILROAD SWITCH TURNOUT HEATING APPARATUS AND PROCESS OF OPERATION THEREOF
Ray Watkins, 4220 Albert St., Amarillo, Tex. 79106
Filed Feb. 2, 1966, Ser. No. 524,627
7 Claims. (Cl. 246—428)

This invention relates to improvements in apparatuses to keep railroad switches as for turnouts clear of interference by snow and ice during inclement cold weather and to improvements in the process of operation thereof.

This invention is directed to improving the efficiency of railroad switch heaters. As brought out below, this invention provides a process and apparatus for economically and selectively heating those portions of a railroad switch as for a turnout most critical to its operation. These portions of the turnout switch selectively heated are the movable portions of the tongue adjacent to its point and the fixed rails adjacent thereto whereby, notwithstanding possibility of accumulation of snow, movement of the switch point and the operability thereof is not encumbered. As brought out below, this is accomplished without any moving solid elements of the switch heater adjacent the switch and an entire absence of interference by the switch heater with the operation of the switch or its components.

This apparatus is inexpensive in regard to materials and fuel and convenient as far as labor is concerned, and requires no skilled labor for the installation thereof.

One object of this invention is to provide railroad switch heaters of improved efficiency of operation, and a process for their operation.

Another object of this invention is to provide railroad switch heaters which have no solid moving parts which directly contact any of the moving parts of a railway switch.

Yet another object of this invention is to provide a process for drying as well as heating selected portions of railroad switch turnout sections and thereby maintaining such switch turnouts in operative condition, notwithstanding wet and cold weather conditions.

Other objects of this invention will become apparent to those skilled in the art on study of the below specification, of which specification the accompanying drawings form a part. In describing the invention reference will be made to the drawings showing a preferred embodiment of my invention. In these drawings, wherein like numbers refer to same parts in all figures.

Figure 1:
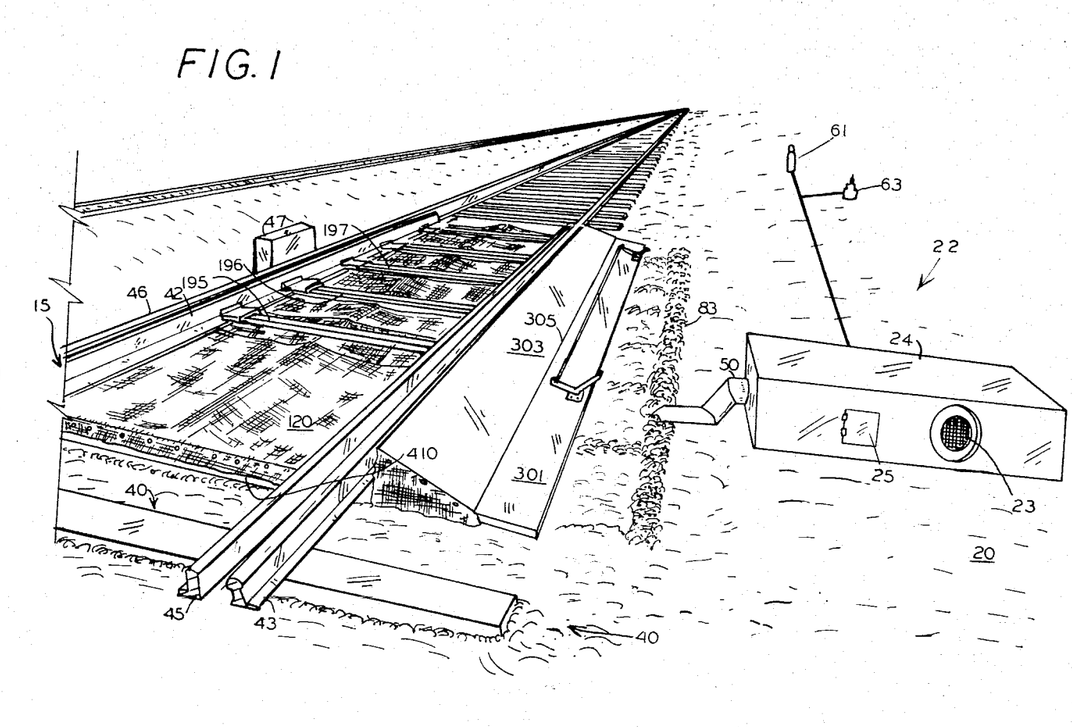
FIGURE 1 is a perspective top oblique view of an installation of switch heater according to this invention.

A railway switch heater installation 15 according to this invention comprises, in operative combination, an air heater and distributor assembly 16, a rail heater shield assembly 17, and a railway switch and turnout section 18.

Section 18 comprises a roadbed 40 of conventional ballast (1" to 2" and ¾ to 1½" crushed stone) a group 41 of ties 410–423 supported on and firmly imbedded in the roadbed, a pair of outer fixed rails 42 (left) and 43 (right) fixedly supported on the ties 410–423, a movable tongue 44, and a conventional switch actuator mechanism 47. The tongue 44 comprises right and left switch point rails 45 and 46 that are pivotally movable to be separated from or operatively contact rails 43 and 42 respectively. Rails 45 and 46 are slidably supported on standard gage plates on the ties and operatively connected to switch mechanism 47.

The particular switch and turnout section 18 (shown diagrammatically in FIGURE 12 in plan view) is a standard railroad switch turnout, i.e. a No. 20 turnout and switch therefor described at pages 171 and 172 of the Atchison, Topeka and Santa Fe Railway System, "Rules—Maintenance of Way and Structures," Operating Department 1960, drawing C.E.S. No. 5870, sheets 1 and 2; the switch tongue 44 is 30 feet long from its point 54 to its heel 55.

Rails 42 and 43 are T-shaped with balls at the base of the T for the 30 feet length of the switch point.

Rails 45 and 46 are L-sectioned for the 30 feet length thereof.

The ties are of varying length over the total length of the switch but are mostly 8' 6" long. The tongue 44 undergoes a maximum lateral travel, at its tips, of about 5 inches. The outer rails are there 4' 8½" apart. The heel spread of the switch is 6¼ inches.

The ties as 410–423 are each about seven inches high and nine inches wide. Each of the adjacent ties as 411 and 412 is spaced from its neighboring tie by a crib space 481; each crib space is from ten to twelve inches wide (and denoted by a reference numeral 70 units higher than the adjacent tie of lowest reference number) each unit of rail and adjacent crib space is 20 inches long.

The heater and distributor assembly 16 comprises an air heating subassembly 65, a control subassembly 67 and a hot air distribution subassembly 69.

The subassembly 65 comprises a heater housing 24, an air pumping and heating unit 26 therein, and a fuel supply tank 28.

The housing 24 is a roofed enclosure firmly fixed in on the ground 20 at the location 22 which location is sufficiently distant (6 feet in the preferred embodiment) from the roadbed 40 of track switch section 18 to avoid any interference with the traffic thereover. Housing 24 encloses an interior heating unit space 27 wherein the heating unit 26 is located. Housing 24 is provided with a door 25 for access thereinto. The walls of the housing are louvered as shown at 23 for ingress of air to the burner. Unit 26 comprises a fan 32, fuel pump 38 and a fuel burner 36. Pump 38 is connected to tank 28 and drives the fuel from the fuel supply tank 28 to burner 36.

The heated air passes from the burner 36 to the heated air discharge line 50 and from the discharge line 50 to the portion of switch section 18 below the shield assembly 17.

In the preferred embodiment of the invention the burner 36 is a conventional 75,000 B.t.u. per hour burner. It burns kerosene or No. 1 fuel oil and has a one nozzle. Such a conventional heater is a Century Engineering Corporation, Cedar Rapids, Iowa, U.S.A., Model CPH 90A. Its dimensions are 31 inches length, 20 inches by 25 inches height. Average fuel consumption per hour is ½ gallon. It produces 350 cubic feet a minute of heated output air when used with its ⅛ H.P. motor (a combination fan and compressor, which operates on 110 to 115 volts A.C. current, single phase). In assembly 16 the fan used is a ⅓ horsepower centrifugal squirrel cage motor (in lieu of the ⅛ horsepower fan provided with the motor). This fan has an output of 1100 c.f.m. at 0 p.s.i.g. static pressure. This combination of assembly 16 produces, at conventional output pressures provided by the apparatus of this invention, a discharge or output of 645 cubic feet per minute at an output temperature of 174° F. While 110 volt A.C. is provided to assembly 16 apparatuses by the line 33, the source of electric power to assembly 16 may be the same source that actuates the switch mechanism 47 of assembly 18, and charges electric battery 35 within the housing 24; such battery "floats" on the line and serves as a source of energy of operation during any temporary failure of the electric power source. The battery and/or the electric power source drives an A.C. or D.C.′ electric motor 37 connected through motor control box 39 to pump 38.

The control subassembly 67 comprises a temperature sensing element 61 and temperature controllers 39 and 59 and a snow sensing element 62 operatively connected to each other and power source 33; control box 39 is supported in the housing 24 and actuated by exterior temperature sensing elements 61 and operatively connected thereto. Element 61 sends the temperature of the ambient air about 30′ from section 18, assembly 26 and 27.

The temperature controller 39 in the preferred embodiment is an International Minneapolis Honeywell regulator, Model L4008C. It has switch points normally open at 35° F. and closed at 32° F. at element 61. It is connected in series with a normally open relay 66 actuated and closed by a photoelectric circuit in element 62 whereby, when the temperature falls to below 35 degrees F. and there is snow falling or on the ground (as determined by the presence thereof in apparatus 62) the fan motor 32, pump 38 and the burner 36 are actuated by power from line 33. The fan pump and heater thus do not operate unless sleet or snow (as indicated by element 62) is also falling or on the ground and the ambient air temperature measured by element 61 is below 32° F. Temperature-sensing element 61, a conventional temperature-sensing instrument, indicated by the standard representation for an instrument locally mounted as set out at page 336 of Eckman, "Industrial Instrumentation," John Wiley & Sons, New York, 1950; alternatively a Model V-1 thermostat of the Berling Instrument Company, South Orange, N.J., may be used: the Minneapolis Honeywell Model L4008C thermostat 0° F.–70° F. range is preferred; the thermostat is adjusted so that the contacts thereof are open when the ambient temperature ascends above 35° F. and remains closed at all temperatures below 32° F. Control box 59, shown in the drawings as a square, is a conventional controller well known per se, such as a Honeywell R7087D resistance thermometer controller, and, in the preferred embodiment, a Minneapolis Honeywell Model RA-816A; the box, controlled by temperature sensitive element 63 under cover 120, actuates relays 591 and 592 to de-energize pump 38, fan 32 and burner 36 when the discharge air temperature below cover 120 rises above 300° F. and to re-energize 36 and 38 when the temperature within 120 drops to 150° F. when also, the ambient temperature, as measured by the sensing element of the controller 39 is below 32° F.

Figure 2:
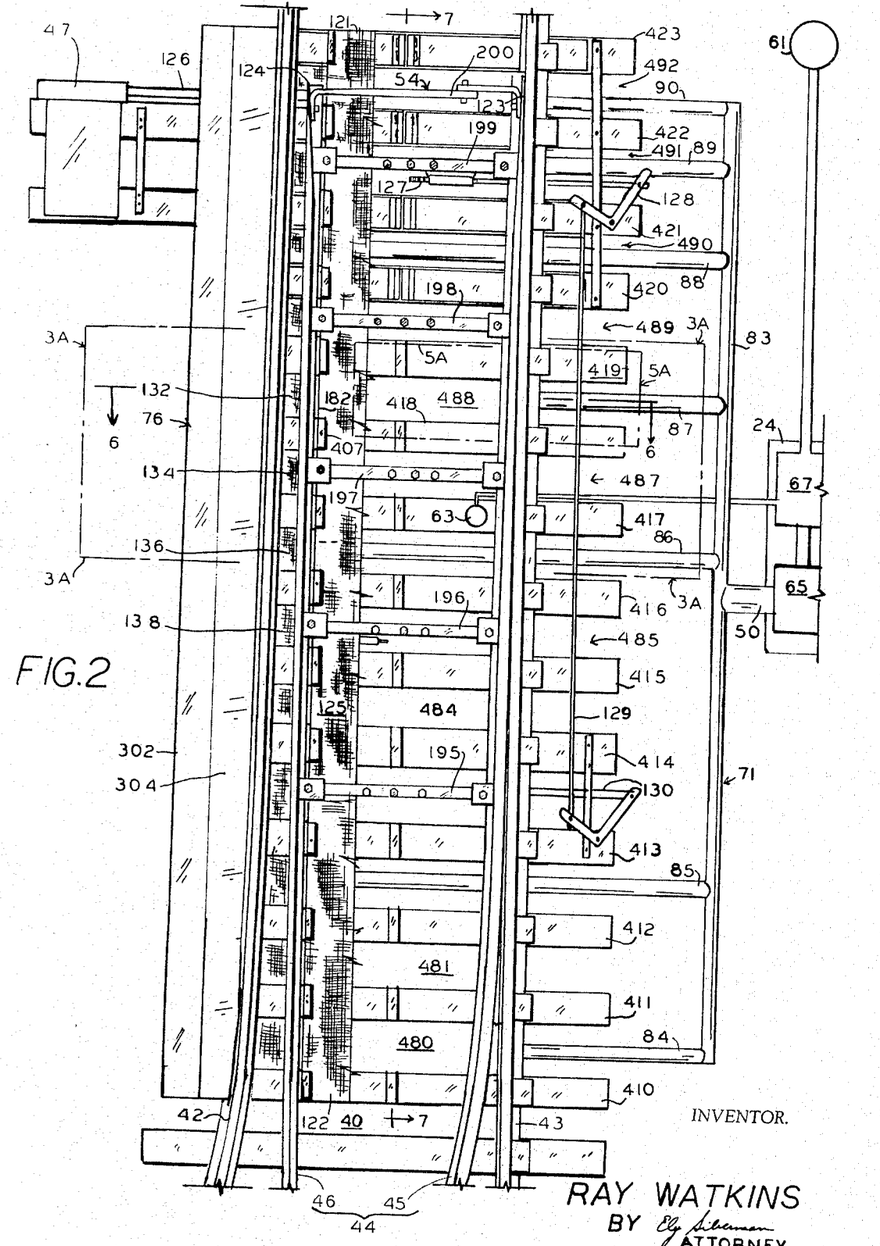
FIGURE 2 is a diagrammatic top view, partly broken away, of portions of the railroad switch and of the track heating elements and of the heater shield of the apparatus shown in FIGURE 1.
Figure 3:
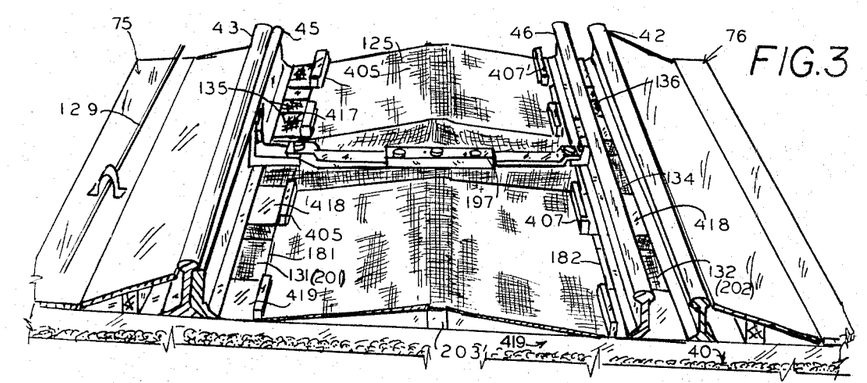
FIGURE 3 is a top oblique view of the zone 3A of FIGURE 2.

The hot air distribution subassembly 69 comprises a duct system 71, a central shield portion 73, a right lateral shield portion 75 and a left lateral shield portion 76. The duct system 71 comprises a main manifold 83 and distribution pipes 84 through 90 operatively connected together. In the preferred embodiment the main manifold 83 is an 8 inch internal diameter 18 gage sheet steel tube located about 1 foot to the right (right as shown in FIGURES 1 and 2) of the group of ties 41, this right side being opposite to the left side of the switch on which left side the switch tongue turnout actuation mechanism 47 is located.

Figures 4, 5:
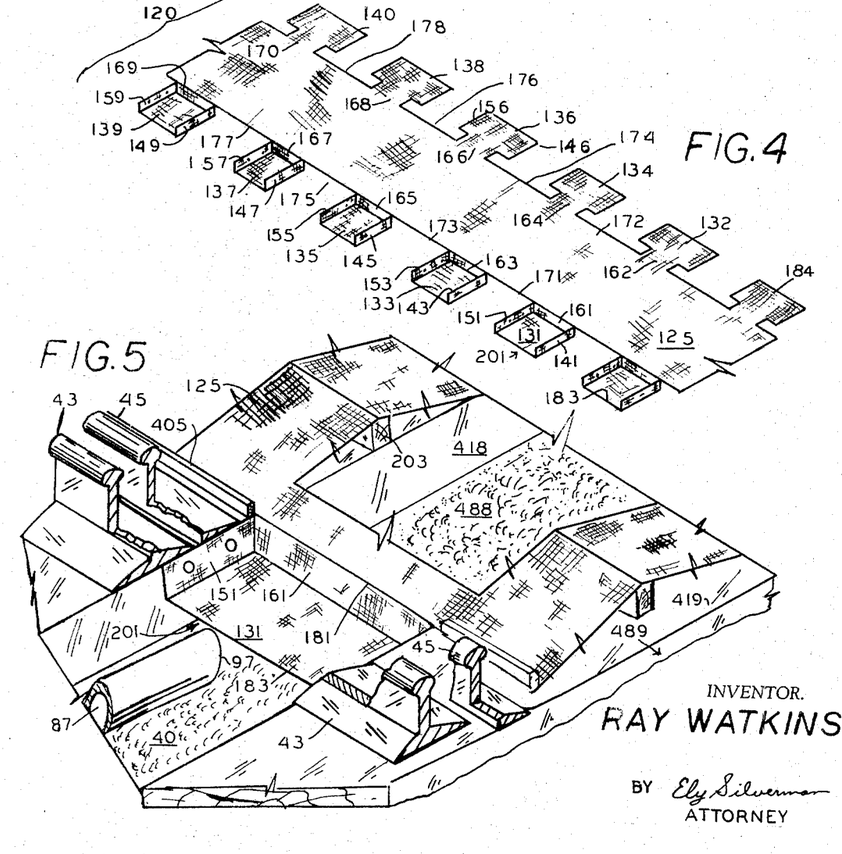
FIGURE 4 is a top perspective view of cover 120 shown in part unfolded and in part folded as when used in operation of apparatus 15 as shown in FIGURE 1.
FIGURE 5 is an enlarged diagrammatic perspective view, partly broken away, of the portion of the installation shown as zone 5A of FIGURE 2.
Figure 6:
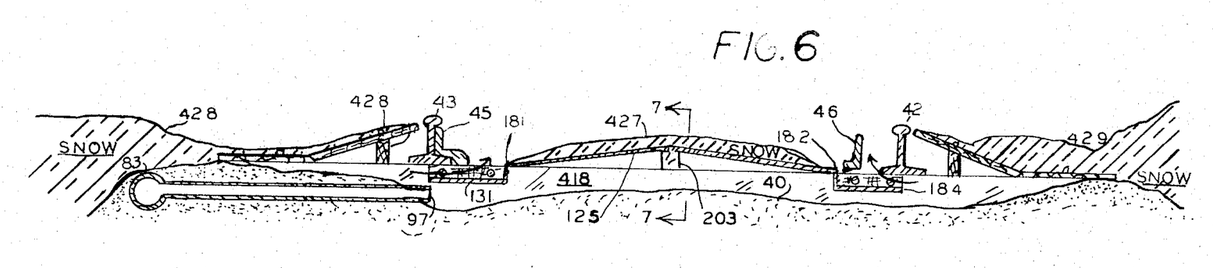
FIGURE 6 is a transverse vertical cross-sectional view along cross-section 6—6 of FIGURE 2 with the switch points positioned as shown in FIGURE 2.
Figure 7:
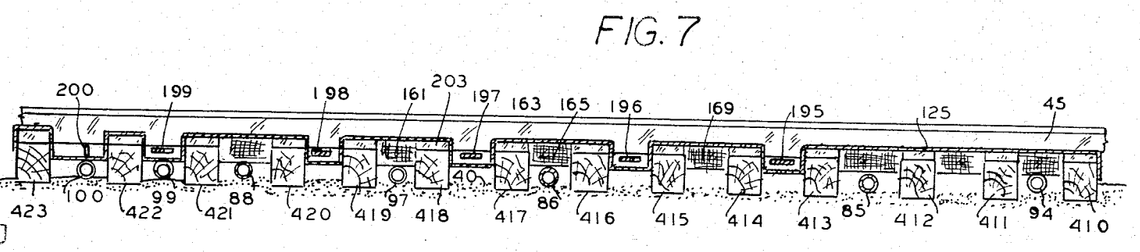
FIGURE 7 is a vertical longitudinal cross-sectional view generally along the vertical plane 7—7 of FIGURES 2 and 6.

The heated air passes from the heating unit 26 via the outlet 50 thereof into the manifold 83. The heated air passes from the main manifold to each of the several distributing pipes 84 through 90. In the preferred embodiment each of these distributing pipes has a 5 inch internal diameter and is likewise made of 18 inch gage steel sheet. In the preferred embodiment, the distributing pipes 84-90 each have discharge openings or outlets 94-100 respectively. The opening outlets are located at and discharge the heated air horizontally to directly below the longitudinal center plane of the outer rail as 42 or 43 of the switch tongue 44 and at a level below the lower, lateral, edges 183 and 184 of the central shield portion 125 (as shown in FIGURES 2 and 5 and 6).

The distributing pipes 84-90 are each located with the top thereof two inches below the base of the neighboring outer rail as 42 or 43. These outlet pipes each extend from and operatively connect to the main manifold 83.

The railway ballast of roadbed 40 is moved away from the immediately below the rails adjacent to the openings of each outlet as 94-100 to allow the hot air to freely discharge from those pipes initially into the space covered by the central or lateral shield portions.

The central shield portion 73 comprises a water proof 20-ounce duck cover 120 of denticulated outline, supports therefor, and appended panels 131-139. The shield 120 is formed of woven heavy 20-ounce duck such as number duck or army duck. Sail duck or canvas could be also suitable. Such cloth is composed of heavy cotton yarn, water-proofed after weaving and has less than 5% of its cross-sectional area open as interstices between the adjacent worn yarns and neighboring filling yarns. It exceeds U.S. regulation CCC–D761 and U.S.Q.M.C. Spec. MIL–D10860 for water repellency.

The cover is continuous although perforate over the major portion of the crib spaces between the rails 42 and 43.

The cover 120 extends from its front end 121 to its rear end 122. The front end extends to tie 423 one tie forward (as shown in FIGURE 2) of the tips 123 and 124 of the movable tongue or turnout switch rails 45 and 46 respectively. The tips of the turnout switch rails 45 and 46 are conventionally connected to and actuated by the switching mechanism 47 by a plurality of conventional tongue locator control rods as 126, 127, 128, 129, and 130, and to each other by tongue width adjustment and control rods 195-200.

The cover 120 passes below all the adjusting rods and control rods 195-200.

The cover 120 comprises a central body portion 125, supports therefor as 203, and panels such as 131-141 for each crib space covered by the cover.

The side edges of cover 120 are formed with laterally protruding rectangular panels 131, 133, and 135, 137 and 139 on the right side and similar laterally protruding rectangular panels 132, 134, 136, 138, 140 on the left side. The panels on the right hand side are shown in FIGURE 4 in their folded position, which folded position is assumed by all such panels, as 131-139 when the cover 120 is in operative place as shown in FIGURES 1, 2, 3, 6, 7, and 8. One pair of each such panels i.e. a right hand panel as 131 and a left hand panel as 132 and its attachments as below described fit each crib space such as 488.

The right hand panels 131, 133, 135, 137, and 139 each have a front ear as 141, 143, 145, 147, and 149 respectively, and a rear ear 151, 153, 155, 157, and 159, respectively. Each panel such as 131 and its ears and neck are each firmly yet flexibly joined to each other and formed of the same material as cover 120. Each panel 131, 133, 135, 137, 139 and its ears are each firmly yet flexibly joined to the body of the cover by a rectangular neck portion 161, 163, 165, 167, and 169 respectively joining the panel to the body. Left hand elements 132, 134, 136, 138, and 140 correspond to elements 130, 131, 133, 135, 137, and 139; left hand elements 142, 144, 146, 148, and 150 corresponding respectively to right hand elements 141, 143, 145, 147, 149; left hand elements 152, 154, 156, 158 correspond to elements 151, 153, 155, 157 respectively; left hand elements 162, 164, 166, and 168 correspond to elements 161, 163, 165, and 167.

The panels as 131, 133, 135, 137, and 139 are separated by spaces 171, 173, 175, 177 therebetween; panels 132, 134, 136, 138, 140 are similarly separated by spaces 172, 174, 176, 178. The inner edge of the right hand spaces as 171, 173, 175, 177, and 179 are bounded by the inner right edge of the central cover body portion 125. The outer right edge of the laterally protruding panels 131, 133, 135, 137, and 139 are bounded by the outer right edge 183 of cover 120. The inner edge of the left hand spaces as 172–178 are bounded by the inner left edge 182 of central cover body portion 125; the outer edge of the laterally protruding left hand protruding panels are bounded by the outer left edge 184 of the cover 125. The cover 125 thus has a denticulated lateral edges the dentils of which denticulation are formed by the laterally protruding rectangular panels as 131–139.

Each panel as 131, its ears as 141, and 151 and its neck as 161 form, in the folded position thereof as shown in FIGURES 4 and 5 a structure in the general shape of a chamber 201 with a laterally open end and open top. As shown in FIGURES 5–8 each chamber as 201 has a front side wall formed of a front panel ear as 141 and the rear wall of the forward tie 419. The front ear as 141 is firmly attached to the rear wall of that tie 419. The chamber 201 also has a rear wall formed of the rear ear 151 and the front wall of the rearward tie 418. The ears are firmly fixed to the ties as by nailing. A vertically extending central wall is formed for the chamber 201 by the neck as 161 of the panel 131. Panel 131 forms the floor of the chamber 201. The top of neck 161 forms a straight edge that is in line with inner right edge 182 of cover body portion 125. The lateral side of box 201 is opened to the enclosed space under the inner edge of the right lateral shield 75; the lower side of the box 201 is formed by panel 131. The upper side of the box 201 is partially covered by the bottom of the rails as 43 and 45 thereabove. The vertical central wall of box 201 (neck 161) extends centrally at least to the most central point of travel of the switch point rail as 45 thereabove. The lateral edge of the panel 131 extends laterally to and is located below the center of the outer rail as 43; edge 184 extends to below the center of rail 42; the lateral edge 181 of cover body portion 125 is firmly fixed to the tie and extends laterally rightwards to a position about ½ inch short of the most left hand position of the left edge or right switch point rail 45.

A series of box-like structure such as 201 over each of the panels as 131 is each open laterally to the adjacent space under the adjacent lateral shield as 75 or 77. Each of these box-like structures with an open end and open top provides for passage of heated air from the space lateral thereto under the right lateral shield 75 and, in the case of panels as 132 under the left shield 76, to the bottom of the rails as 42 and 45 or 43 and 46 the bottom surface of which rails are located above the box-like structure. This structure also provides for passage of the hot air from the space below the central portion of the cover 125 of the cover 120 into the open lateral end of the box and from the box to the upper side thereof and to the rails thereabove.

The width of each space as 171 between neighboring panels as 131 and 132 is the distance across the tie as 418 separating such neighboring panels. The distance across each panel as 131 is the distance between neighboring vertical faces of the ties as 418 and 419, between which ties the panel 131 is to be located. The width of each ear as 141 and 142 is the distance of the panel 131 below the top of the ties adjacent to which the panel 131 is to be located.

The distance across each pocket or chamber as 201 from the right lateral edge 183 to the base (neck 161) of the pocket 201 is determined by the length of travel of the switch rails as 45 and 46. In the preferred embodiment the depth of the chamber is 12 inches, the ears as 141 and 143 are 1½ inches wide whereby panel 131 is 1½ inches below the top of the neighboring ties as 418 and 419 in FIGURES 5, 6, and 8.

The center of shield portion 125 is spaced away from the top of ties 410–423 by wooden slats formed of conventional 2″ x 4″ material 8 inches long, such as 203, firmly held to the top of each tie as 418. This provides for spacing away the top of the center shield portion from the top of each tie as 418 and provides for passage of heated air through such space over the ties as 418 to crib spaces as 487 into which hot air from pipes as 84–90 is not directly discharged. This provides for heating the crib spaces into which outlets 94–100 do not directly discharge as well as to heating the lower surface of cover directly above each tie. The space under the center shield is heated directly by the passage thereinto of hot air from the pipes as 84, 87, 89, and 90 as well as by the discharge of hot air from the lateral spaces of the crib under the lateral shields by central passage of that hot air under the laterally projecting panels as 131–139.

The inner lateral edges 181 and 182 of the central shield are firmly held down to the ties by 1″ x 2″ lumber nailed down to the tie such as shown by slats 405 and 407. The lateral portions of the central shield are firmly held down to the ties 410–423 for the full length of the cover 120. The cover body portion is firmly held at its ends to ties therebelow as 410–423 by nailing and the use of the strips 405 and 407. The flexibility of the cover 120 permits that cover to withstand the movement suffered by the rails as 42, 43, 45, and 46 when trains pass thereover. The slight porosity to air of the cover minimizes the impact of the vacuum created by the passage of a high speed train along the switch and above the cover 125 as well as that the porosity of the cover facilitates the heating of any snow accumulated above the cover 120. Relative to the rails 43 and 42 adjacent thereto, the right and left lateral shield portion 75 and 76 are mirror images of each other: accordingly the description of one such portion applies to the other; numbers for components of the left hand portion 76 (as 302) are even and one unit higher than corresponding elements of the right hand portion 75 (as 301).

The right lateral shield portion 75 is formed of an imperforate lateral portion, as 301, formed of 8-inch wide, ¾-inch thick plywood and a 16-inch wide sloped, central portion as 303, also formed of ¾-inch imperforate plywood sheet, which extends from the inner edge 305 of portion 301 to within ¹⁄₁₆-inch of the head of the adjacent rail 43 and with the bottom surface of the portion 303 at the level of the bottom of the head of the adjacent rail leaving a very narrow (¹⁄₁₆-inch) right lateral air escape space 343 between rail 43 and shield portion 75. The portion 303 is also held in place by a support 307 fixed to the tie and may rest on a rail brace. A bolt 311 fixes portion 303 to its support as 307 and tie as 418, and bolt 313 ties the plate as 301 to its tie as 418. The relations of the plates to the tie are the same in other ties except where gage plates are used, as on ties 420 and 422. There the steel gage plate as 315 is bolted to tie as 422 and the panel 303 is provided with a hole to clear and adjust the nut of the chair or brace for the rail 43.

The supports are so spaced and located as to provide that the hot air generated by the heating assembly 26 and passed into the crib spaces as 480–492, will travel from one crib space, as 488, to the adjacent crib space, as 489, over the intervening tie, as 419 and equalize the temperatures therein.

The ¾-inch, 5-ply plywood, outside grade, used for the shields 75 and 76 component panels provides a small heat transfer as well as electrical insulating element between the rails. The heat insulating and imperforate characteristics of the shield provide that the heat generated by the heating and distributing assembly 16 causes a drying as well as heating current of air to pass through the air escape spaces as 343, 344 and boxes as 201 and 202 past the heads of the adjacent rails, which rails are thereby kept warm as well as dry. Such currents also pass through the interstices between the rails at the points of said rails and serve to keep them dry.

The portions of the shield on the outside, or lateral, portions of the rails 45 and 46 are supported on the ties therefor and, as above described for the central portions, provide for passage of the hot air developed by the assembly 16 from one crib space to the others laterally of the rails. As there is only a 1/16-inch left lateral air escape space 342 between the central portion of the sloped, left lateral panel, 76, and the head of the adjacent rail only a small heating and drying current of air passes through that narrow air escape zone as well as zone 343. The porous roadbed 40 permits cold air to enter into the space above the vicinity of the heating conduits 84–90 from the sides of the shield 75 and 76 (and ties) and, after being heated, to rise to the air escape spaces. The shields direct the flow of such heated air to the zones at which such heated air most efficiently dries the rails where needed.

The operation of the heating subassembly 16, actuated by control elements 61, 62, and 63 as above described, provides a substantial upward flow of hot and dry gas (air) through the space or channels between the bases of the switch turnout rails and an adjacent tongue rail, i.e. between rails 43 and 45 or between rails 42 and 46 and concurrently to the zone to which the other one of the rails forming the tongue 44 (e.g. 45 or 46) is to move in order to maintain the operability of the switch. As shown in FIGURE 6 when the rails 45 and 46 are in the position there shown with rail 42 separated from rail 46 and rail 43 adjacent 45, heated air from the heater 26 and chambers 202 heats the lateral or exterior surface portion of the rail 46 and also the zone between rails 42 and 46 while the passage of heated air to the zone central of rail 46 is mostly blocked off. This flow of hot dry air (at 174° F.) melts and removes any snow or ice that might tend to form between rails 46 and 42. A minor flow of hot air escapes past the central edge of rail 46 and the lateral edge of rail 42. A small amount of hot air also passes upward through the interstices of the cloth forming cover 120. The amount of flow through the interstices is large enough to be felt by the hand when there is no snow on the cover 120 and serves to keep cover 120 warm and melt and carry away snow from the cover 120 that might otherwise accumulate to form drifts. This removal of snow from the zone between the spaced apart switch tongue rail 46 and fixed rail 42 permits the rail 46 to subsequently be moved toward the rail 46, as in FIGURE 8 notwithstanding the accumulation of ice or snow elsewhere near section 18. At the same position of the rails 42 and 46 the hot air passes upward between the interior surface of the rail 45 and the inner right edge 181 of center portion 125 of the cover 120. This flow of hot (174° F.) dry air clears that zone of snow as well as warming rails 45 and 43 and permits the rail 45 to move centrally when desired notwithstanding the accumulation of ice or snow elsewhere near section 18 (the snow and ice in the zone between rails 46 and 42 being removed as above described). Shields 75 and 76, being nonporous and being wooden and substantially good heat insulators, prevent loss of the heat through the lateral portion of the rails 42 and 43.

Figure 8:
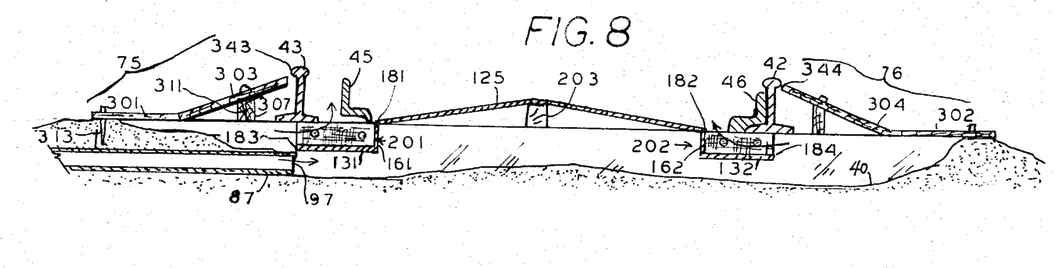
FIGURE 8 is a vertical transverse sectional view as in FIGURE 6 but with the switch points thereof moved to the opposite position than shown in FIGURE 6.

In the position of the rails 45 and 46 of tongue 44 shown in FIGURE 8 hot air from units 26 and duct system 71 flows from below shield 75 to the boxes, as 201 formed by the laterally protruding panels as 131 (and 133, 135, 137, 139) to below rail 43 and thence upwards and centrally towards the outer surface of rail 45 and maintains a flow of hot dry air between rail 43 and 45 to permit the rail 45 to later move laterally notwithstanding the accumulation of snow elsewhere near section 18. Concurrently (in the position of the rails shown in FIGURE 8) the hot air delivered to below shield 76 moves to below rails 46 and 42 and warms the bases of those rails and flows between the inner left edge 182 of cover 120 and the central portion of rail 46 and so permits the subsequent central movement of that rail notwithstanding the accumulation of snow or ice elsewhere near section 18 (any snow and ice between rails 43 and 45 being removed as above described).

This relatively low intensity of temperature of the air below shields 73, 75, and 77, i.e., below 300° F. produces only moderate heating and drying action of the ties while it removes moisture from, as well as prevents its collection on the rails 42, 43, 45, and 46. Drying of the rails and ties by flow of dry and hot air according to the apparatus and process of this invention is a continued operation which is efficiently and economically carried out without damage to the wood structure on the railbed, without violent temperature stresses to the metal parts, at a relatively steady states and without any moving parts.

Figure 9:
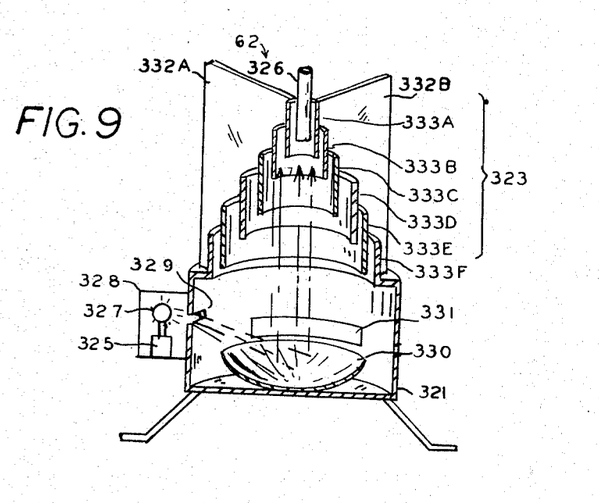
FIGURE 9 is a diagrammatic showing, partly broken away, of the sensing element 62.
Figure 10:
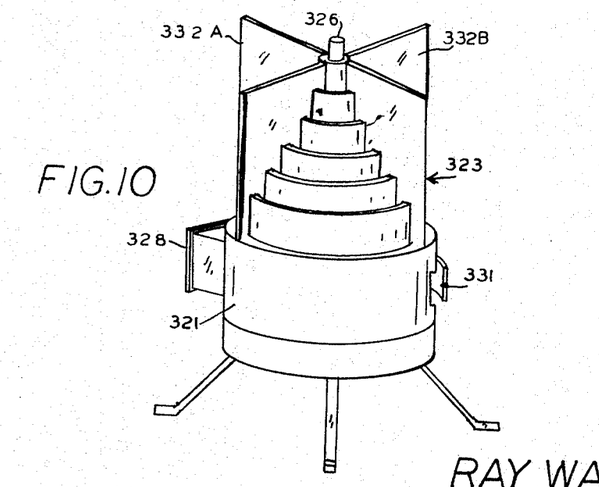
FIGURE 10 is a perspective view of element 62.

Assembly 62 comprises a housing 321, a collimator assembly 323 and an electrical circuit 325.

The collimator comprises a series of coaxial hollow imperforate cylindrical annularly spaced apart tubes as 333A, 333B, 333C, 333D, 333E, and 333F of stepped height with their axes vertical and a pair of vertical flat rectangular collimator reinforcing plates 332A and 332B perpendicular to each other. Plates 332A and 332B are each firmly fixed to all of the collimator tubes and to the top of the side wall of housing 321.

The dimensions of the tubes are as on Table I in the preferred embodiment.

TABLE I

| Tube No. | Height over Top of Box 321, inches | Outside Diameter of Tube, inches |
|---|---|---|
| 333A | 12 | 2 |
| 333B | 10 | 4 |
| 333C | 8½ | 5½ |
| 333D | 6½ | 7½ |
| 333E | 5 | 8½ |
| 333F | 3 | 10 |

The central tube 333A is tallest (12″ high over housing 321), the most radial 333F is shortest: each tube reaches 2″ below the upper edge of the tube exterior thereto.

The housing 321 is a cylindrical box 12 inches high and 12 inches in diameter made of 18 gage steel sheet as are the collimator tubes above described actuator. The housing 321 is provided with an access door 331 which, when closed, forms a light-tight seal with the side of the housing. The housing 321 together with its door form a cylindrical housing imperforate at its bottom and closed at its sides but open at its top and the top is exposed to the window of the photoelectric cell 326 through the space within the collimator tubes. A neon light 327 mounted in a side housing portion 328 of the housing passes through louvers 329 light to a removable plate 330 at the bottom of the housing 321. A 9 inch diameter blackened dull metallic plate 330, imperforate and dished concave upwards for ½ inch at its edge is removably located at the bottom of housing 321 to receive snow thereon and reflect light to cell 326 from light source 327.

A photoelectric cell 326 is mounted on a tube 326 is mounted at the top of the upmost collimator ring 333A. The tube extends 3 inches below the top of tube 333A. The cell faces downward toward the plate 330 at the bottom of and interior of the housing 321. Tube 326 is actuated by the light reflected by plate 330, only when there is snow thereon, from light 327 in the housing 321. The circuit 325 including tube 326 used in a photo tube relay circuit is such as shown in FIGURE 289 of page 345 of Coyne, "Electronics for Electricians and Radio Men," Coyne Electrical School, Chicago, 1945. (The operation of such standard photo tube relay is described at page 345–346 of Coyne.)

Figure 11:
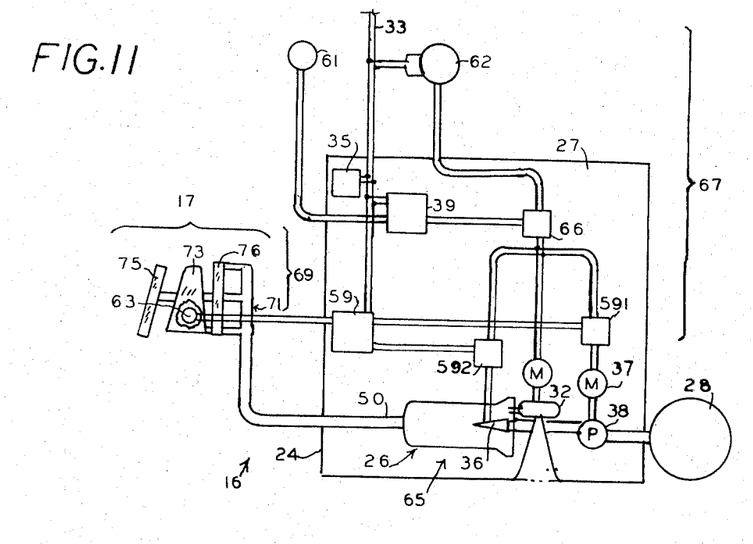
FIGURE 11 is a diagrammatic showing of the relationships of the electrical components of the apparatus shown in FIGURE 1.

The power source for the apparatus electrical apparatus as shown in FIGURE 11 and herein above described is the usual 4800 volt A.C. line which goes to a railroad relay housing; the relay housing operates "floating" batteries to provide 29 volt D.C. which operates the railroad signals and the switch actuator apparatus 47. A 110 volt A.C. line 33 taps this source to actuate and power the photoelectric tube and its circuit. The sensitivity of the phototube is variable by adjustment along a conventional voltage divider (as item A of FIGURE 289 of Coyne).

In operation snow or sleet coming through the annular upwardly open interstices between the collimating tubes 323A, 323B, 323C, 323D, 323E, and 323F reaches to and collects on the plate 330 at the floor of the housing 321. Light from the light source 327 when reflected from snow on the plate 330 reaches to the photoelectric cell and (when snow falls) actuates the photoelectric cell 326 in the circuit 325 and closes the relay 66 and thereby provides power therethrough from the source 33 to the pump 38, fan 32 and burner 36.

Thereby, according to this invention, the sensor 62 operates the relay 66.

When the D.C. line used to actuate the switch mechanism 47 is used rather than a 110 volt A.C. line the pump 38, fan 32, and burner 36, controls 61, 62, 63, 39 and 59 may be D.C. actuated and a floating battery may then be operatively connected to such a D.C. line in heater housing 24.

Figure 12:
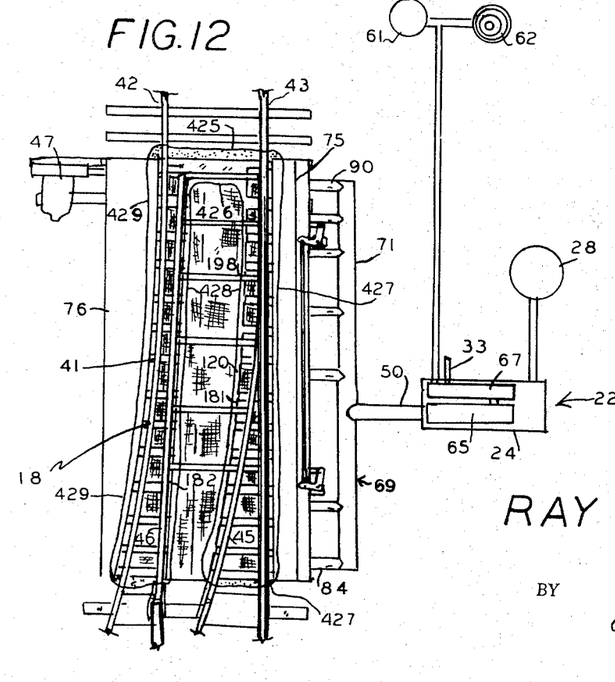
FIGURE 12 is an overall diagrammatic plan view of the installation of which the apparatus of FIGURE 1 forms the central portion.

While switch heating apparatus has been described above in terms of a turnout switch for purposes of distinction from the title of my copending application, it is to be understood that this switch heating apparatus may also be used for railroad crossover switches or other railroad switches. While the shield 73, 75, 76, and section 18 in FIGURES 1 and 2 are there shown as they generally appear and are approximately to scale, FIGURE 12 is exaggerated to show that while the relations between the shield 76 and rail 42 are the mirror image of the relations of shield portion 75 to rail 43, portions 75 and 76 are not entirely parallel to each other, as rails 42 and 43 approximate each other along the 30 foot length of the tongue 44. (The heel spread of the switch in this particular instance is 6¼ inches, which is greater than the travel of the points of the switch.)

Similarly, the edges 181 and 182 of central cover portion 73 are not entirely parallel to each other as the lines forming the central edges of the zones covered by the sideways movements of rails 45 and 46 are also not truly parallel to each other, not withstanding the amount of divergence of such lines is a small amount relative to the entire 30 foot length of the tongue 44. Such lines which bound the edges of the zones covered by movements of rails 45 and 46 are the lines between the inner edges of chambers or pockets as 201 over the series of right hand panels as 131, 133, 135, 137, and 139 and the lines between the inner edges of pockets as 202 over the series of left hand panels as 132, 134, 136, and 138. The exaggeration of FIGURE 12 is to show these relationships as well as relative location of the items above referred to as 61, 62, 63, 26, 28 and assembly 73, 75, and 77.

The shield portions 73, 75, and 76 extend sufficiently in the direction of the heel of the switch tongue 44 from the points thereof to maintain free of snow and ice all that area over which each of the tongue rails as 45 and 46 is required to move in order to operatively contact the adjacent fixed rail 42 and 43. For the particular embodiment above described a 20 foot length of switch is all that is required to be heated by assemblies 26 and 27 to retain the operativeness of the switch when the section 18 might otherwise be covered by snow and/or ice; longer (and shorter) stretches of heating panels as 73, 75, and 76 will be required for switches where the length of contact of the tongue rails as 45 and 46 and the fixed rails as 42 and 43 are greater (and less, respectively).

In an operation of the preferred embodiment of the apparatus 15 above described and situated at the West End interlock of the Santa Fe Railroad at Amarillo following a snow storm which delivered 7 inches to the track section 18 at temperatures ranging from −6° F. to −2° F. and with wind velocities averaging 5–15 miles per hour the periphery of the snow in the morning (when the temperature was about 0° F.) is shown by lines 425 and 426 in FIGURE 12 and 427, 428, and 429 in FIGURE 6. The use of apparatus 15 resulted in that there was no snow in the area over which the rails 45 and 46 usually move on operation of the switch tongue 44. Also, the sides and top and bottom of the rails 42 and 43 and 45 and 46 were entirely free of snow from the rear edge of the cover 120 to its front edge. The apparatus 15 positively and efficiently maintained the switch entirely operative notwithstanding such snow storms rendered all of several other nearby switches inoperative and notwithstanding the relatively low B.t.u. input of 75,000 B.t.u. per hour of unit 26 or only 3,000 B.t.u. per running foot of railroad track under such cold and wet conditions.

It is, of course, within the scope of this invention that greater heat inputs such as 90,000 B.t.u. would be used where more severe conditions might be expected to be met. For this purpose a larger nozzle is put onto the burner 36 to provide for a greater B.t.u. input with, of course, a corresponding greater fuel consumption where such is deemed necessary.

Although, in accordance with the provision of the patent statutes, particular preferred embodiments of this invention have been described and the principles of this invention have been described in the best mode in which it is now contemplated applying such principles, it will be understood that the operations and constructions shown and described are merely illustrative and that my invention is not limited thereto and, accordingly, alterations and modifications which readily suggest themselves to persons skilled in the art without departing from the true spirit of the disclosure hereinabove are intended to be included in the scope of the annexed claims.

I claim:

1. An apparatus for sensing snow comprising a snow catching opaque chamber enclosed at its sides and bottom, a source of light and means for application of said light to the interior and bottom of said chamber, a series of concentric and concentrically spaced apart vertically extending opaque collimating channels open at their top to the atmosphere and at their bottom into the snow catching chamber, annular spaces between said channels, a photosensitive element exposed to and open to the bottom of said chamber through a channel defined by said collimating elements, a photoelectrically actuated relay operatively connected to said photosensitive element and actuated thereby.

2. An apparatus for heating a railroad switch, said switch comprising a roadbed, ties supported on the roadbed, crib spaces between adjacent ties, a pair of outer rails fixedly supported on the ties, a pair of tongue rails with tips slidably supported on the ties between the fixed rails, a switch actuator mechanism for moving one or the other of said tongue rail points into contact with one or the other of said fixed rails, and operatively connected to said tongue rails by connecting means therebetween, the distance between the points of said tongue rails being less than the distance between said fixed rails adjacent thereto, said apparatus comprising a hot gas producing unit spaced away from said rails, an ambient temperature sensing unit, a central shield between said tongue rails, and lateral shields each lateral of said fixed rails and operatively connected together, and a gas producing control unit, said ambient temperature sensing unit actuating said hot gas producing unit, said hot gas producing unit operatively connected to gas conduit means, said gas conduit means extending to operatively connect to said crib spaces below the level of said fixed rails and below said central and lateral covers, said central shield comprising a central cover portion and lateral cover portions, said central cover portion being flexible and attached to the ties central of the zone of movement thereover of said tongue rails and above a portion of the crib spaces and, on each side of said central portion, lateral panels protruding laterally from said central portion and below and spaced away from the bottom of the fixed rails, said lateral panels being connected to said central portion along a line central of but adjacent to the central edge of the zone over which said rails of said tongue move, said central portion extending from the heel of the tongue to its points and past the points of said tongue, said central cover portion extending at least as far toward the heel of the tongue as the length of the tongue which contacts the fixed rails, said lateral shield means each attached to the ties laterally of the fixed rails, said lateral shield means each extending along the length of said outer rails for the same length as said central cover and being fixed to the ties and covering over the crib spaces between said ties lateral to said fixed rails and extending downwards and outward of the top of each of said fixed rails.

3. An apparatus as in claim 2 wherein said central cover has a portion raised from the top of some of said ties and an air space is located below said raised portion and said air space communicates with an air space in the crib space on either side of said tie, and wherein said tongue rails are interconnected by control rods, and said control rods are located above said central cover portion and said lateral panels each extend across a crib space from one vertical face of a tie to the vertical face of an adjacent tie.

4. An apparatus as in claim 2 wherein said hot gas producing unit comprises a gas heating unit, and gas discharge ducts and said gas heating unit discharges into said ducts and some of said ducts extend below the lateral shield and some below the central shield and said ducts have outlets some below the lateral shield and some below the central shield.

5. An apparatus as in claim 4 wherein an apparatus sensitive to the presence of snow is operatively connected to a relay and said relay operatively connects the temperature sensitive apparatus, and the control unit to the gas heating unit.

6. An apparatus for heating a railroad switch, said switch comprising a roadbed, ties supported on the roadbed, crib spaces between adjacent ties, a pair of outer rails fixedly supported on the ties, a pair of tongue rails with tips slidably supported on the ties between the fixed rails, a switch actuator mechanism for moving one of the other of said tongue rail points into contact with one or the other of said fixed rails, and operatively connected to said tongue rails by connecting means therebetween, the distance between the points of said tongue rails being less than the distance between said fixed rails adjacent thereto, said apparatus comprising a hot gas producing unit, an ambient temperature sensing unit, a central shield between said tongue rails, and lateral shields each lateral of said fixed rails and operatively connected together, and a gas producing control unit, said ambient temperature sensing unit actuating said hot gas producing unit, said hot gas producing unit operatively connected to said crib spaces below the level of said fixed rails and below said central and lateral covers, said hot gas producing unit comprising a gas heating unit and gas discharge ducts and said gas heating unit discharges into said ducts and some of said ducts extend below the lateral shield and some below the central shield and said ducts have outlets some below the lateral shield and some below the central shield, said central shield comprising a central cover portion and lateral cover portions, said central cover portion being flexible and attached to the ties central of the zone of movement thereover of said tongue rails and above a portion of the crib spaces and, on each side of said central portion, lateral panels protruding laterally from said central portion and below and spaced away from the bottom of the fixed rails, said lateral panels being connected to said central portion along a line central of but adjacent to the central edge of the zone over which said rails of said tongue move, said central portion extending from the heel of the tongue to its points and past the points of said tongue, said central cover portion extending at least as far toward the heel of the tongue as the length of the tongue which contacts the fixed rails, said lateral shield means each attached to the ties laterally of the fixed rails, said lateral shield means each extending along the length of said outer rails for the same length as said central cover and being fixed to the ties and covering over the crib spaces between said ties lateral to said fixed rails and extending downwards and outward of the top of each of said fixed rails, wherein an apparatus sensitive to the presence of snow is operatively connected to a relay and said relay closes and then operatively connects the temperature sensitive apparatus and the control unit to the gas heating unit and wherein a temperature sensitive element located below the cover is operatively connected to a relay and opens the relay when the temperature under said cover exceeds a predetermined maximum and closes the relay when said temperature is below a predetermined minimum and said relay when closed operatively connects said temperature sensing element and said now sensing element to said gas heating unit and its control.

7. A process for maintaining a railway switch operative notwithstanding the accumulation of snow and ice in the neighborhood thereof comprising the steps of sensing the temperature and presence of snow in the ambient air near a switch, generating heated air when snow is detected and the ambient temperature of the switch approaches freezing and passing said heated air selectively to the zone below and between one tongue rail and one fixed rail neighboring to the said tongue rail of a switch and concurrently passing heated air below and centrally of the other tongue rail adjacent to another fixed rail to the zone over which said other tongue rail centrally moves while confining heated air laterally of said fixed rails and adjacent thereto and centrally and below said tongue rails and wherein the generation of heated air is stopped when the temperature below the tongue rails reaches a predetermined temperature.

References Cited by the Examiner

UNITED STATES PATENTS

| | | | |
|---|---|---|---|
| 1,325,977 | 12/1919 | Boardman | 246—428 |
| 1,661,040 | 2/1928 | Gervasio | 246—428 |
| 1,778,637 | 10/1930 | Hollinger | 246—428 |
| 1,902,339 | 3/1933 | Ruby | 246—428 |
| 2,048,533 | 7/1936 | Zavatkay | 246—428 |
| 2,051,918 | 8/1936 | Thompson | 246—428 X |
| 2,122,154 | 6/1938 | Reynolds | 246—428 |
| 2,355,014 | 8/1944 | Schorn | 340—234 |
| 2,359,787 | 10/1944 | Peters et al. | 340—234 |
| 3,157,800 | 11/1964 | Burwell | 340—234 X |
| 3,194,960 | 7/1965 | Tuttle | 246—428 |
| 3,223,835 | 12/1965 | Cherry et al. | 246—428 |
| 3,233,097 | 2/1966 | Watkins | 246—428 |

ARTHUR L. LA POINT, *Primary Examiner.*

S. B. GREEN, *Assistant Examiner.*